S. GOLDSMITH.
Wheel-Cultivator.
No. 29,583.
Patented Aug. 14, 1860.
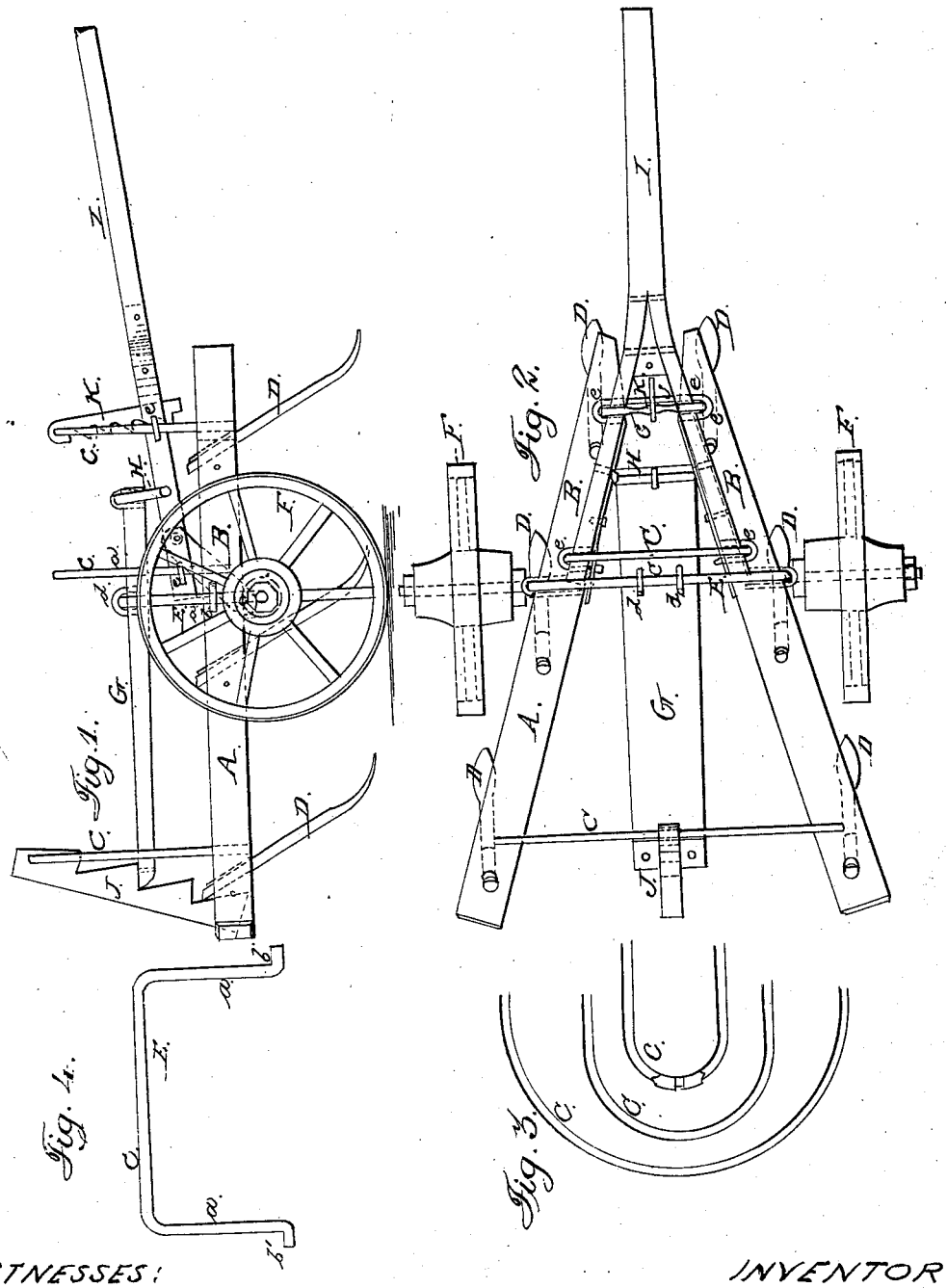

UNITED STATES PATENT OFFICE.

SCHUYLER GOLDSMITH, OF WATAGA, ILLINOIS.

IMPROVEMENT IN CULTIVATORS.

Specification forming part of Letters Patent No. 29,583, dated August 14, 1860.

*To all whom it may concern:*

Be it known that I, SCHUYLER GOLDSMITH, of Wataga, in the county of Knox and State of Illinois, have invented a new and Improved Cultivator; and I do hereby declare that the following is a full, clear, and exact description of the same, reference being had to the annexed drawings, making a part of this specification, in which—

Figure 1 is a side elevation of my invention. Fig. 2 is a plan or top view of the same. Figs. 3 and 4 are detached views of parts pertaining to the same.

Similar letters of reference indicate corresponding parts in the several figures.

The object of this invention is to obtain a cultivator which will admit of being adjusted or raised and lowered bodily while the operator is seated on the implement, and also admit of having its front part raised or lowered, as circumstances may require.

The invention consists in a novel arrangement of the draft-pole, axle, and seat, in connection with steps, substantially as hereinafter described, whereby the desired end is attained.

To enable those skilled in the art to fully understand and construct my invention, I will proceed to describe it.

A represents the frame of the implement, which is formed of two bars, B B, which have an oblique position relatively with each other, as shown in Fig. 2, and connected by three bow-shaped rods, C, the form of which is shown plainly in Fig. 3. Each bar B has a number of cultivator-teeth, D, attached to it of the usual or any proper form.

E is the axle of the implement, which is of bent form, as shown clearly in Fig. 4. This axle is not rigidly attached to the frame A, its sides $a\ a$ being fitted loosely in guides $b\ b$ at the sides of the bars B B, the wheels F being fitted on the horizontal terminals $b'$, which are the arms of the axle.

To the upper horizontal portion, $c$, of the axle E there is attached a plank, G, which constitutes the driver's seat. The seat G may be attached to the portion $c$ by staples or eyes $d$, which admit of the seat working up and down on $c$ as a center. The front end of the seat G is attached by a link, H, to the back part of the draft-pole I, which is fitted to the two front rods, C C, by eyes $e$, the back end of the draft-pole being forked, so as to be secured at both sides of the rods C C, the eyes $e$ being allowed to work or slide on the rods C C.

To the back rod, C, a pendent rack, J, is attached, the back end of seat G engaging with said rack. To the front rod, C, a similar rack, K, is suspended, into which a rod, $f$, at the back part of the draft-pole catches.

From the above description it will be seen that by adjusting the back end of the seat G higher or lower in the rack J the frame A will be raised or lowered, the frame rising and falling on the sides $a\ a$ of the axle. The driver on seat G may therefore at any time elevate the teeth D entirely above the surface of the ground, as shown in Fig. 1.

By adjusting the rod $f$ of the draft-pole I higher or lower in the rack K the front part of the implement may be raised or lowered and set to any given depth.

Having thus described my invention, what I claim as new, and desire to secure by Letters Patent, is—

The combination and arrangement of the seat G, draft-pole I, racks J K, and axle E, applied to the frame A, substantially as and for the purposes set forth.

SCHUYLER GOLDSMITH.

Witnesses:
EDWARD H. GOLDSMITH,
SIDNEY L. WILMOT.